No. 748,323. PATENTED DEC. 29, 1903.
G. A. WALL.
THERMOSTAT.
APPLICATION FILED OCT. 28, 1902.
NO MODEL.
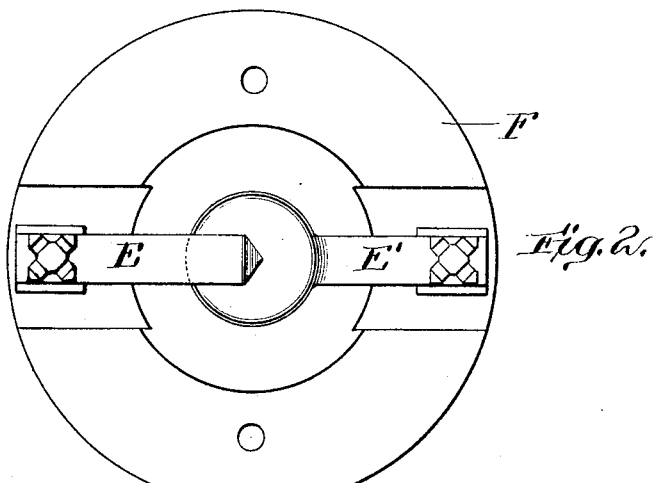
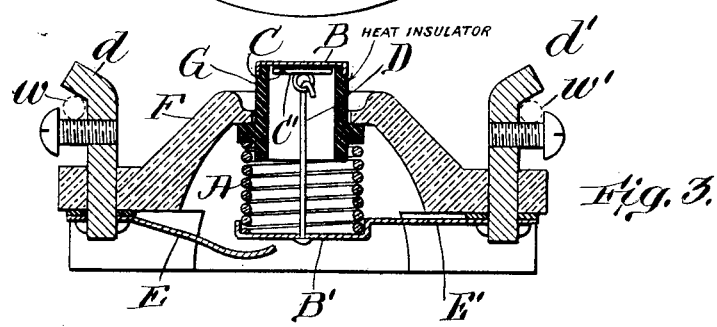
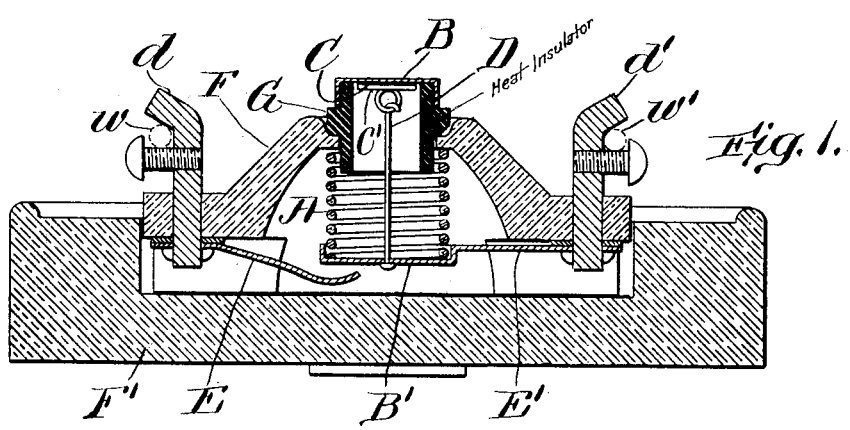
Witnesses:
Inventor:
George Augustus Wall,
by Maynadier & Rockwell
Attorneys.

No. 748,323.

Patented December 29, 1903.

UNITED STATES PATENT OFFICE.

GEORGE AUGUSTUS WALL, OF PROVIDENCE, RHODE ISLAND.

THERMOSTAT.

SPECIFICATION forming part of Letters Patent No. 748,323, dated December 29, 1903.

Application filed October 28, 1902. Serial No. 129,134. (No model.)

*To all whom it may concern:*

Be it known that I, GEORGE AUGUSTUS WALL, of Providence, in the county of Providence and State of Rhode Island, have invented a new and useful Thermostat, of which the following is a specification.

The object of my invention is to produce a simple thermostat which is certain to operate on a given rise of temperature, is very simple, inexpensive, durable, easily refitted for a second use, and adapted generally for all uses for which a thermostat is desirable; and my invention consists in a thermostat made up of a spiral spring, two plates or disks of metal, and a flat film of solder holding the two plates flatwise together until the tension of the spring overcomes the fused or partly-fused film of solder and moves that one of the plates which is fast to the spring away from the other plate in a line normal to the film of solder, as more fully explained below.

In the drawings, Figure 1 is a cross-section of one of my thermostats complete. Fig. 2 is a bottom plan of the upper part of Fig. 1. Fig. 3 is a modification.

In the preferred form of my thermostat shown in the drawings, A is a spiral spring whose abutments B B' are connected when the spring A is under compression by a film of solder C, fusible at the desired temperature between plates B and C', so that when plate C' is suitably connected to abutment B' the compression of spiral spring A depends upon the film of solder C between plate B and plate C', which prevents those plates B and C' from flying apart under the force of spiral spring A, so that when the film of solder C is fused one of the abutments, in this case B', is carried by the spiral spring A directly away from the other abutment and in a direction normal to the planes of both abutments and of the film of solder and makes contact between electrodes E E' or otherwise, either electrically or mechanically, shows that the temperature has risen to the fusing-point of solder C and that solder C has melted or so softened by heat that the spiral spring has been released and has forced the abutments apart by a strain directly across the film of solder instead of in a line parallel with that film, as heretofore. This operation of my thermostat under a given rise of temperature injures no part of my thermostat except the film of solder, so that my thermostats after one operation can be refitted for a second use by simply resoldering plate B to plate C'.

One use of my thermostat is as an automatic circuit-closer, and in order to adapt my thermostat for ready use for this purpose I provide a cap F and base F' of a dialectric, commonly porcelain, which forms a holder for my thermostat and also for the electrodes E E', which are in electrical connection with the wires $w$ $w'$, carried by the binding-posts $d$ $d'$, as will be clear from the drawings without more detailed description.

As it is desirable to carry plate B well clear of the holder F F', especially in order to prevent heat radiating from it to its holder, I use a sleeve G of fiber or other good heat-insulator between abutment B and that part of cap F on which one end of spring A directly bears and in this way make my thermostat almost perfectly sensitive, for if it were not for this heat-insulating sleeve G the rise in temperature of the air about the outer surface of plate B must be sufficient to bring not only plate B, but practically its holder F F' and spring A and the other abutment B', each and all, to the temperature required to fuse or nearly fuse the film of solder C, whereas when plate B is insulated from the chilling effect of the other parts my thermostat is much more sensitive than when the spiral spring A bears directly on plate B and plate B bears directly on cap F.

In the modification shown in Fig. 3 my thermostat is movable in order to act as a push-button, as will be plain without further description.

Other uses of my thermostat are described in my application filed October 28, 1902, Serial No. 129,133.

The heat-insulating sleeve G is a second feature of my invention of much practical importance, as it enables me to provide thermostats closely adjusted to operate at widely-different temperatures by simply using a solder C fusible at the required temperature, whereas in all thermostats heretofore made the chilling effect of the holder and other parts had an influence which made it practically impossible to determine what solder to use in order to insure the prompt action of the thermostat under all conditions of rising temperature when the predetermined temperature is reached, which is the main object of my invention and attained with a close approach to accuracy by using a film of solder C to connect the two plates B and C', holding a spiral spring under compression, and with still greater accuracy by using also the sleeve G to protect the film of solder C between the plates from the chilling effect of contiguous parts.

In Fig. 1 there are two springs tending to separate B and B'. This is wholly new with me—that is, E' is a leaf-spring as well as an electric connection between $w'$ and $d'$, on the one hand, and B', on the other, and that leaf-spring E' tends to carry B' into contact with E, and the spiral spring A reinforces E' as a spring and makes it certain that whether E' be set or not—that is, whether it be weak or strong or act to prevent contact between B' and E—yet the spiral spring A will cause that contact with certainty.

What I claim as my invention is—

The improved thermostat above described comprising the holder F of electric insulating material; the sleeve G; the plate B supported on the sleeve G; the plate C' within the sleeve G, and connected with plate B by a flat film C of fusible solder; the spiral spring A, one abutment B' of which is connected to plate C' by rod D; and electrodes E E' which are brought into electric contact by the motion of abutment B', all substantially as described.

GEORGE AUGUSTUS WALL.

Witnesses:
   C. B. MAYNADIER,
   G. A. ROCKWELL.